US012162359B2

(12) United States Patent
Klim et al.

(10) Patent No.: US 12,162,359 B2
(45) Date of Patent: Dec. 10, 2024

(54) SYSTEM FOR TRAVEL ALONG THE GROUND OF A TERRESTRIAL TRANSPORT VEHICLE CAPABLE OF LEVITATING

(71) Applicant: SAFRAN LANDING SYSTEMS, Velizy Villacoublay (FR)

(72) Inventors: Graeme Klim, Moissy-cramayel (FR); Andrew Ellis, Moissy-cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 791 days.

(21) Appl. No.: 17/312,272

(22) PCT Filed: Dec. 10, 2019

(86) PCT No.: PCT/EP2019/084476
§ 371 (c)(1),
(2) Date: Jun. 9, 2021

(87) PCT Pub. No.: WO2020/120496
PCT Pub. Date: Jun. 18, 2020

(65) Prior Publication Data
US 2022/0032782 A1     Feb. 3, 2022

(30) Foreign Application Priority Data
Dec. 10, 2018 (FR) ........................ 1872625

(51) Int. Cl.
*B60G 17/016* (2006.01)
*B60L 13/06* (2006.01)
(Continued)

(52) U.S. Cl.
CPC .......... *B60L 13/06* (2013.01); *B60G 17/0164* (2013.01); *B60T 8/325* (2013.01);
(Continued)

(58) Field of Classification Search
CPC ............ B60G 17/0164; B60G 2400/61; B60G 2400/71; B60G 2400/73; B60G 2400/732; B60L 13/06; B60T 8/325; B64C 25/46
(Continued)

(56) References Cited

U.S. PATENT DOCUMENTS 5,044,660 A * 9/1991 Yamamura ......... B60G 17/0195
280/5.52
5,088,762 A * 2/1992 Fukuyama ......... B60G 17/0162
280/5.506
(Continued)

FOREIGN PATENT DOCUMENTS

FR     3 013 665 A1    5/2015
GB     2 366 269 A     3/2002

OTHER PUBLICATIONS

International Search Report for PCT/EP2019/084476 dated, Feb. 13, 2020 (PCT/ISA/210).

*Primary Examiner* — Erick R Solis
(74) *Attorney, Agent, or Firm* — Sughrue Mion, PLLC

(57) ABSTRACT

A ground movement system for a land transport vehicle (2) capable of levitating, the vehicle having a plurality of wheels including at least one actuated wheel (3), a drive device (6) for driving the actuated wheel and/or a brake (8) for braking the actuated wheel (3), a vertical positioning actuator (9) arranged to move the actuated wheel (3) vertically relative to a fuselage of the vehicle (2), and control means arranged to act, during an acceleration stage and/or during a braking stage of the vehicle, to control the vertical positioning actuator (9) as to adjust the vertical position of the actuated wheel in order to increase the load carried by the actuated wheel and thus increase the maximum force that can be transmitted to the ground by the actuated wheel so as to increase the maximum drive and/or braking torque that can (Continued)

be produced by the drive device (6) and/or by the brake (8) without the actuated wheel (3) skidding or slipping.

13 Claims, 3 Drawing Sheets

(51) Int. Cl.
    *B60T 8/32*       (2006.01)
    *B64C 25/46*    (2006.01)

(52) U.S. Cl.
    CPC .......... *B64C 25/46* (2013.01); *B60G 2400/61* (2013.01); *B60G 2400/73* (2013.01)

(58) Field of Classification Search
    USPC .......... 701/37, 82; 244/104 FFP, 110 H, 111; 303/133, 192
    See application file for complete search history.

(56) References Cited

U.S. PATENT DOCUMENTS

| | | | | |
|---|---|---|---|---|
| 5,297,646 | A * | 3/1994 | Yamamura | B60K 23/0808 180/197 |
| 5,359,490 | A | 10/1994 | Oguro | |
| 5,839,741 | A * | 11/1998 | Heyring | B60G 21/04 280/124.167 |
| 9,056,537 | B2 * | 6/2015 | Eberling | B60W 10/18 |
| 9,272,599 | B1 | 3/2016 | Cook, Jr. et al. | |
| 9,975,391 | B2 * | 5/2018 | Tseng | B60G 17/0162 |
| 11,453,387 | B1 * | 9/2022 | Huennekens | B60W 10/04 |
| 2007/0265749 | A1 * | 11/2007 | Fitzgibbons | B60W 50/00 701/37 |
| 2008/0183353 | A1 * | 7/2008 | Post | B60G 17/0195 701/84 |
| 2009/0322048 | A1 * | 12/2009 | Glavinic | B60G 17/0165 701/37 |
| 2012/0046827 | A1 | 2/2012 | Larkins et al. | |
| 2015/0224845 | A1 * | 8/2015 | Anderson | F03G 7/08 701/37 |
| 2017/0136842 | A1 * | 5/2017 | Anderson | B60G 99/002 |
| 2017/0368931 | A1 * | 12/2017 | Tesar | B60K 17/046 |
| 2018/0022405 | A1 * | 1/2018 | Gecchelin | G05D 1/0088 701/23 |
| 2018/0251123 | A1 * | 9/2018 | Sigmar | B62D 17/00 |
| 2023/0294473 | A1 * | 9/2023 | Ali | B60G 17/0161 701/37 |
| 2023/0331056 | A1 * | 10/2023 | Birch | B60G 17/0164 |

\* cited by examiner

SYSTEM FOR TRAVEL ALONG THE GROUND OF A TERRESTRIAL TRANSPORT VEHICLE CAPABLE OF LEVITATING

CROSS REFERENCE TO RELATED APPLICATIONS

This application is a National Stage of International Application No. PCT/EP2019/084476 filed Dec. 10, 2019, claiming priority based on French Patent Application No. 1872625 filed Dec. 10, 2018, the entire contents of each of which being herein incorporated by reference in their entireties.

The invention relates to the field of ground movement systems for a land transport vehicle that is capable of levitating.

BACKGROUND OF THE INVENTION

Nowadays, and throughout the world, certain particularly innovative businesses are working on projects seeking to test a revolutionary so-called "Hyperloop®" transport system under real conditions, and then to put it into service. This transport system consists in causing pressurized capsules containing passengers or goods to travel at high speed in a network of tubes that are evacuated (or at very low pressure).

In these projects, moving a capsule at high speed generally makes use of the principle of propulsion by magnetic induction. The capsule is propelled by linear induction motors that are positioned at regular intervals along the tube.

The capsule is also caused to levitate, which enables the capsule to slide inside the tube without friction (or almost). Such levitation requires a lift force to be created. The lift may be magnetic, in which case it is obtained by fitting the capsule with magnets. The lift may also be air-cushion lift.

In order to be able to "take off" inside the tube, and be maintained in levitation, the capsule must exceed a certain speed.

At low speeds, i.e. at speeds up to and below about 100 kilometers per hour (km/h), the use of a more traditional system for moving along the ground is envisaged. The term "ground" is used herein to mean that the capsule is on the ground, specifically inside the tube, without being subject to levitation. The "ground" may thus be ground that is flat or a track of arbitrary shape, for example.

The capsule is thus provided with wheels, with drive devices for driving the wheels in rotation, and with wheel brakes for braking the capsule. It is essential to ensure that the ground movement system is capable of imparting considerable acceleration to the capsule when it starts, and also that the system is capable of braking the capsule effectively on reaching its destination.

OBJECT OF THE INVENTION

An object of the invention is to provide a ground movement system for a land transport vehicle capable of levitating, the system having high-performance acceleration and braking.

SUMMARY OF THE INVENTION

In order to achieve this object, there is provided a ground movement system for a land transport vehicle capable of levitating, the vehicle having a plurality of wheels including at least one actuated wheel, a drive device for driving the actuated wheel and/or a brake for braking the actuated wheel, a vertical positioning actuator arranged to move the actuated wheel vertically relative to a fuselage of the vehicle, and control means arranged to act, during an acceleration stage and/or during a braking stage of the vehicle, to control the vertical positioning actuator as to adjust the vertical position of the actuated wheel in order to increase the load carried by the actuated wheel and thus increase the maximum force that can be transmitted to the ground by the actuated wheel so as to increase the maximum drive and/or braking torque that can be produced by the drive device and/or by the brake without the actuated wheel skidding or slipping.

With a prior art land transport vehicles capable of levitating, it is known that, during a stage of accelerating on the ground, the driven wheels (i.e. the wheels fitted with devices for driving them in rotation) can produce maximum drive torque, above which skidding occurs. The maximum drive torque depends in particular on the load applied to a driven wheel, on the coefficient of friction between the driven wheel and the ground, and on the state of the contact surface between the vehicle and the ground. Likewise, during a braking stage, the braked wheels can produce a maximum braking torque, above which slipping occurs.

These skidding and slipping phenomena reduce the acceleration and braking performance of the vehicle, in particular in emergency situations where it can be necessary for acceleration to be very high or for braking to be very strong. When tires are used, the drop in performance is greatest when the weight of the vehicle or the pressure in the tires might vary over a large range, and also when the tires are worn.

If the actuated wheel is a driven wheel, i.e. a wheel fitted with a drive device, then, by adjusting the vertical position of the actuated wheel, the ground movement system of the invention makes it possible to increase the maximum drive torque that can be produced without skidding.

Likewise, if the actuated wheel is a braked wheel, i.e. a wheel fitted with a brake, the ground movement system of the invention makes it possible, by adjusting the vertical position of the braked wheel, to increase the maximum braking torque that can be produced without slipping.

This serves to improve the acceleration and braking performance of the vehicle.

There is also provided a land transport vehicle capable of levitating, including the ground movement system as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
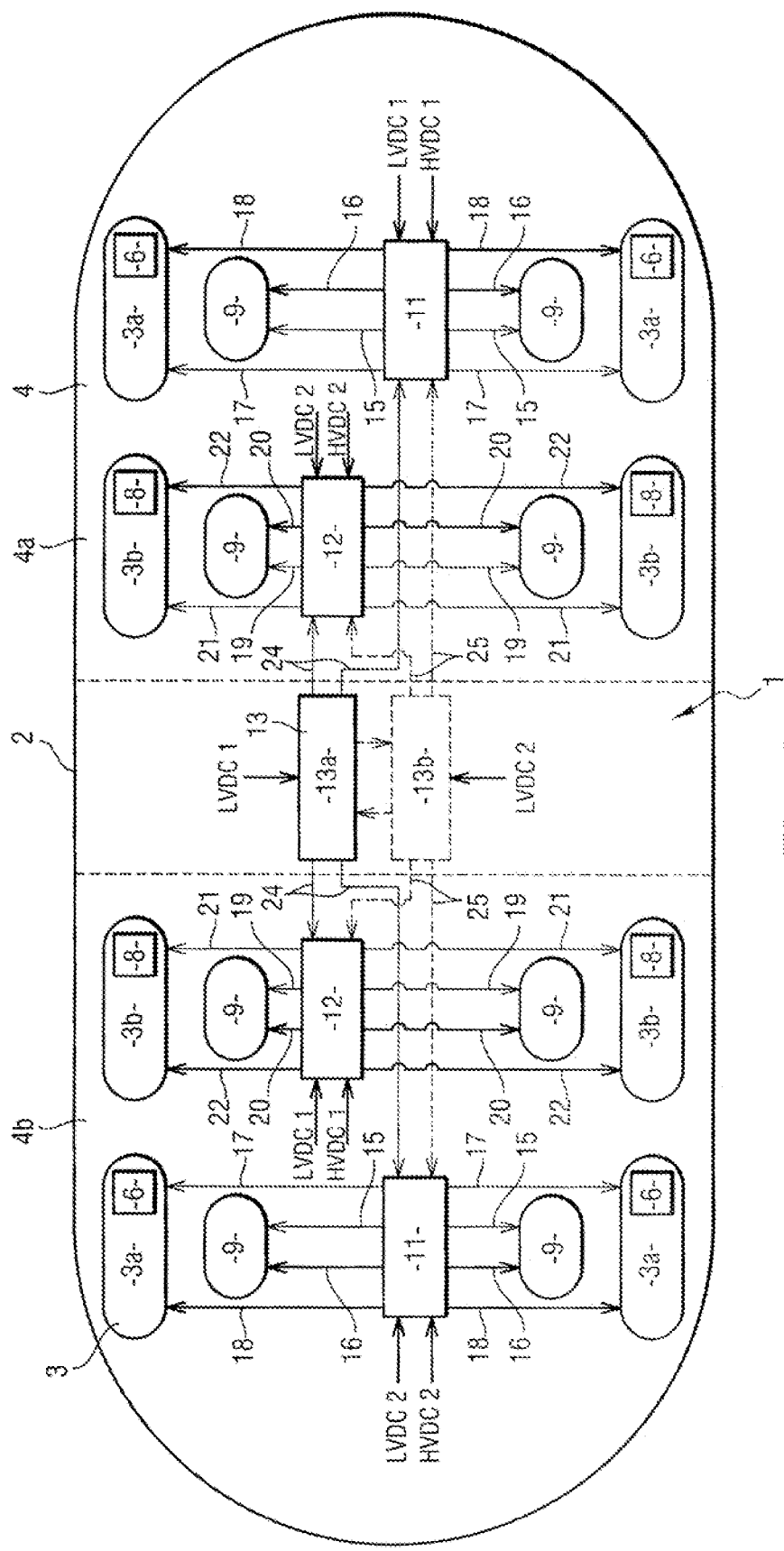
FIG. 1 is a diagram of a ground movement system of the invention.

With reference to FIG. 1 and in this example, a ground movement system 1 of the invention for moving a Hyperloop® capsule 2 has eight wheels 3 that are said to be "actuated", which wheels are positioned on two independent bogies 4a and 4b. The term "actuated" is used to mean that movements of the wheels 3 are controlled directly by actuators that are associated with said wheels 3. No mention is made herein of any free-running "non-actuated" wheels that the capsule 2 may optionally (but not necessarily) include.

In this example, each actuated wheel 3 is provided with a pneumatic tire.

Each bogie 4 thus has four actuated wheels 3, i.e. two actuated wheels 3 positioned on a right side and two actuated wheels 3 positioned on a left side of said bogie 4.

On each bogie 4, there are two inner actuated wheels 3 that are positioned towards the middle of the capsule 2, and two outer actuated wheels 3 that are positioned towards an end of the capsule 2.

The actuated wheels 3 comprise both so-called "driven" wheels 3a and so-called "braked" wheels 3b. The driven wheels 3a are the outer actuated wheels 3. The braked wheels 3b are the inner actuated wheels 3.

For each bogie 4, the ground movement system 1 has two drive devices 6.

Each drive device 6 is for driving a respective driven wheel 3a in rotation. Naturally, a drive device 6 is used when accelerating the capsule 2, but it can also be used for braking the capsule 2 by applying torque to the driven wheels 3a that acts in the opposite direction to the acceleration imparted by the movement of the capsule 2.

In this example, the drive devices 6 are independent. Each drive device 6 includes an electric motor. The electric motor has an outlet shaft that co-operates with the associated driven wheel 3a via a mechanical interface optionally including a reduction system and/or a clutch system in order to drive the driven wheel 3a in rotation.

For each bogie 4, the ground movement system 1 includes two brakes 8, i.e. one brake 8 associated with each braked wheel 3b for the purpose of braking said braked wheel 3b.

The brakes 8 are independent. Each brake 8 comprises both braking actuators and also friction members, e.g. a stack of rotors/stator disks made of materials that are compatible with environmental conditions and the expected braking and wear performance.

In this example, the braking actuators are electromechanical actuators. Each braking actuator comprises an electric motor and a pusher. The electric motor of a braking actuator drives the pusher, which moves linearly towards the friction members of the brake 8 of a braked wheel 3b, and which exerts a braking force on the friction members in order to brake the braked wheel 3b.

The ground movement system also includes four vertical positioning actuators 9 for each bogie 4. Each vertical positioning actuator 9 serves to impart vertical movement to a respective actuated wheel 3 (i.e. a driven wheel 3a or a braked wheel 3b) relative to a fuselage (or to a bogie) of the capsule 2, and to adjust the vertical position of the actuated wheel 3.

In this example, the vertical positioning actuators 9 are independent electromechanical actuators.

Each vertical positioning actuator 9 comprises a leg made up of a cylinder secured to the fuselage of the capsule 2 and a rod that slides in the cylinder. An actuated wheel 3 is mounted at the bottom end of the rod.

Each vertical positioning actuator 9 further comprises an electric motor. The electric motor drives the rod, which moves linearly and which thus moves the actuated wheel 3 vertically.

Each vertical positioning actuator 9 also includes a shock absorber device and a spring.

It should be observed that each vertical positioning actuator 9 thus acts as an extension/retraction actuator. The vertical positioning actuator 9 extends the rod having an actuated wheel 3 at its bottom end in order to place the actuated wheel 3 on the ground during stages of accelerating and braking the capsule 2 on the ground, and it retracts the rod while the capsule 2 is levitating.

It should be observed that one possible technique for shifting the wheel-carrying rod could be as follows. The strut could be threaded on its outside face. A screw set into rotation by the motor could thus move along the strut. A lever arm serves to lower or raise the wheel.

In order to control and power the electric motors of the drive devices 6, of the braking actuators of the brakes 8, and of the vertical positioning actuators 9, the ground movement system 1 includes control means. The control means comprise two first electrical power modules 11 (one per bogie 4), two second electrical power modules 12 (one per bogie 4), and two electrical control modules 13.

In each bogie 4, the first electrical power module 11 is connected to each of the vertical positioning actuators 9 of the driven wheels 3a by a respective signal line 15 for each actuator and by a respective power line 16 for each actuator.

In each bogie 4, the first electrical power module 11 is connected to each of the drive devices 6 of the driven wheels 3a by a respective signal line 17 and by a respective power line 18.

In each bogie 4, the second electrical power module 12 is connected to each of the vertical positioning actuators 9 of the braked wheels 3b by a respective signal line 19 for each actuator and by a respective power line 20 for each actuator.

In each bogie 4, the second electrical power module 12 is connected to each of the brakes 8 (and thus to their braking actuators) of the braked wheels 3b by a respective signal line 21 for each brake and by a respective power line 22 for each brake.

Each electrical power module 11, 12 comprises hardware components and software components that serve to power and to control the electric motors to which it is connected. The control in question includes controlling the electric motors, the actuators themselves (drive devices, braking actuators, vertical positioning actuators), delivering power, managing temperature, and managing the wear of the tires on the actuated wheels 3.

The power lines 16, 18, 20, and 22 convey control electric currents for controlling the electric motors.

The signal lines 15, 17, 19, and 21 convey data exchanged between the actuators and the electrical power modules 11 and 12. This data may potentially be conveyed in both directions and in particular it may comprise measurement data produced by sensors that are positioned on or in the proximity of the motors, of the actuators, of the friction members of the brakes 8, etc.

The first electrical power module 11 of the bogie 4a is powered by a first high voltage power bus HVDC 1 and by a first low voltage power bus LVDC 1.

The second electrical power module 12 of the bogie 4a is powered by a second high voltage power bus HVDC 2 and by a second low voltage power bus LVDC 2.

The first electrical power module 11 of the bogie 4b is powered by the second high voltage power bus HVDC 2 and by the second low voltage power bus LVDC 2.

The second electrical power module 12 of the bogie 4b is powered by the first high voltage power bus HVDC 1 and by the first low voltage power bus LVDC 1.

Each of the two electrical control modules 13 comprises a main electrical control module 13a and an alternative electrical control module 13b.

The main electrical control module 13a is connected to each of the two first electrical power modules 11 and to each of the second electrical power modules 12 via respective signal lines 24 (i.e. via four distinct signal lines 24).

The main electrical control module 13a is powered by the first low voltage power bus LVDC 1.

Likewise, the alternative electrical control module 13b is connected to each of the two first electrical power modules 11 and to each of the second electrical power modules 12 via respective signal lines 25 (i.e. via four distinct signal lines 25).

The alternative electrical control module 13b is powered by the second low voltage power bus LVDC 2.

The electrical control modules 13 transmit control signals to the electrical power modules 11 and 12. The electrical power modules 11 and 12 generate the control electric currents for the electric motors on the basis of the control signals and using electrical energy coming from the HVDC and LVDC power buses.

In this example, the electrical control modules 13 are arranged redundantly. The electrical control modules 13 operate in an active-passive mode. In normal operation, only the main electrical control module 13a is activated in order to produce the control signals. In the event of the main electrical control module 13a suffering a failure, it is deactivated, and it is the alternative electrical control module 13b that produces the control signals. It should be observed that it would be possible to implement an active-active mode in which, by way of example, the electrical control modules 13 produce the control signals in turns.

The presently-described architecture is thus redundant not only in terms of the electrical control module 13, but also in terms of the high and low voltage power buses. Loss of one of the two high-voltage power buses HVDC, or of one of the two low-voltage power buses LVDC, cannot lead to the loss of more than one electrical control module 13, of more than 50% of the drive devices 6, of more than 50% of the brakes 8, or of more than 50% of the vertical positioning actuators 9.

During an acceleration stage, the above-described control means, comprising the electrical power modules 11 and 12 and the electrical control modules 13, serve to adjust independently the vertical positions of the driven wheels 3a in order to increase the loads carried by the driven wheels 3a and thus in order to increase the maximum forces that can be transmitted to the ground by the driven wheels 3a, thereby increasing the maximum drive torque that can be produced by the drive devices 6 without the driven wheels 3a skidding.

Likewise, during a braking stage, the control means serve to adjust independently the vertical positions of the driven wheels 3a and of the braked wheels 3b in order to increase the loads carried by the driven wheels 3a and by the braked wheels 3b, and thus to increase the maximum forces that can be transmitted to the ground by the driven wheels 3a and by the braked wheels 3b so as to increase the maximum braking torques that can be produced by the drive devices 6 and by the brakes 8 without the driven wheels 3a or the braked wheels 3b slipping. The ground movement system of the invention operates as follows.

During stages in which the capsule 2 is being accelerated, each drive device 6 produces drive torque to drive the associated driven wheel 3a in rotation. The drive torque may be increased up to a maximum drive torque, above which the driven wheel 3a might skid. When the drive torque approaches the maximum drive torque, the vertical positioning actuator 9 associated with said driven wheel 3a transfers a portion of the load of the capsule 2 by moving the driven wheel 3a a little away from the fuselage of the capsule 2a. The driven wheel 3a thus presses harder against the ground. This increases the load (or the weight) carried by the driven wheel 3a. The maximum force that can be transmitted to the ground by the driven wheel 3a increases. At constant coefficient of friction between the ground surface of the tube and the wear surface of the driven wheel 3a (i.e. the surface of its tire in contact with the ground), it is thus possible to increase the maximum drive torque and thus to increase the acceleration imparted to the driven wheel 3a. The change in load may be monitored by sensors, and in particular by sensors for sensing load, torque, pressure, movement, etc.

During stages in which the capsule 2 is being braked, each brake 8 produces braking torque for braking the associated braked wheel 3b. Likewise, each drive device 6 produces reverse torque forming braking torque enabling the associated driven wheel 3a to be braked. Each of these braking torques can be increased up to a maximum braking torque, above which the braked wheel 3b or indeed the driven wheel 3a might slip.

When the braking torque approaches the maximum braking torque, the vertical positioning actuator 9 associated with said actuated wheel 3 (i.e. driven wheel 3a or braked wheel 3b) transfers a portion of the load of the capsule 2 by moving the actuated wheel 3 a little away from the fuselage of the capsule 2.

This increases the load (or the weight) carried by the actuated wheel 3. The maximum force that can be transmitted to the ground by the actuated wheel 3 increases. At constant coefficient of friction between the ground surface of the tube and the surface of the tire of the actuated wheel 3, it is thus possible to increase the maximum braking torque and thus to increase the braking produced by the actuated wheel 3. In this example, increasing the load increases the area of contact between the tire and the ground, and thus increases the grip of the tire on the ground.

Figure 2:
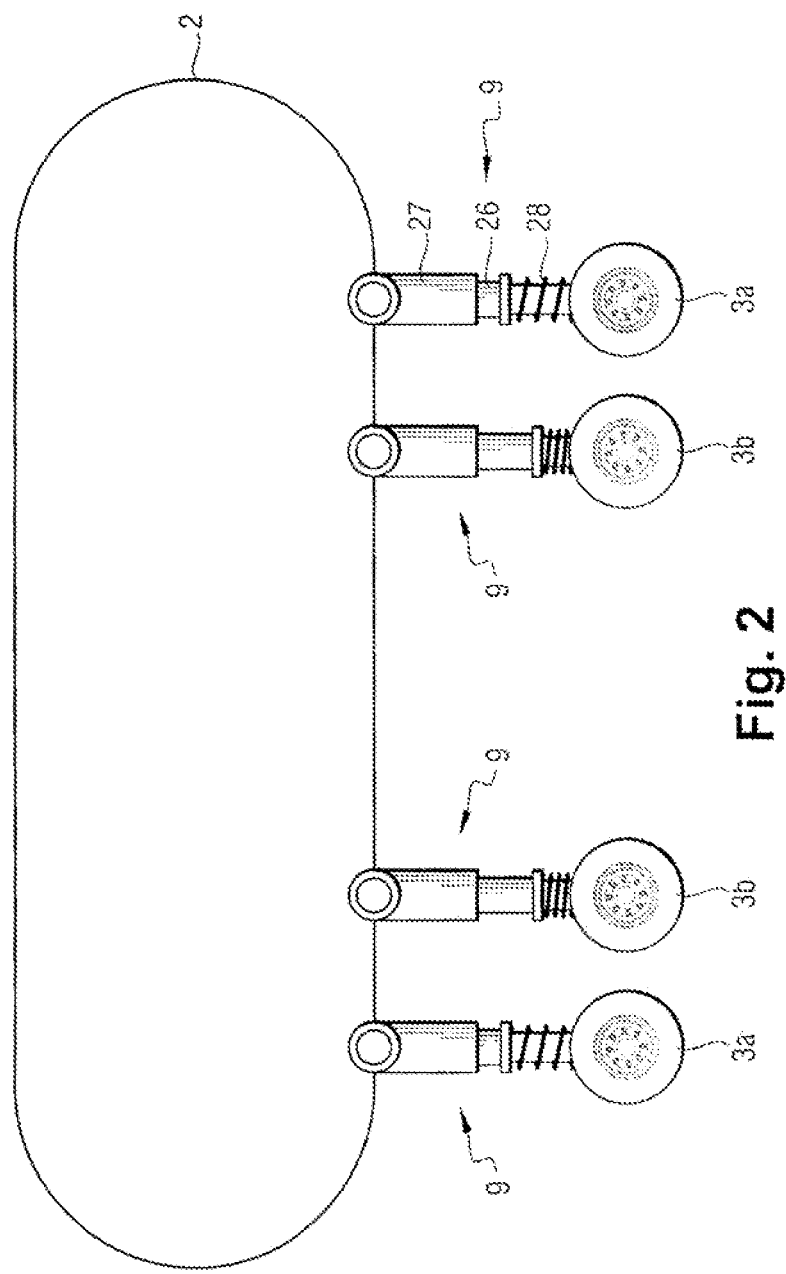
FIG. 2 is a diagrammatic side view of a Hyperloop® capsule, showing actuated wheels and vertical positioning actuators for the actuated wheels.

Thus, and with reference to FIG. 2, it can be seen that during a braking stage, the vertical position of the braked wheels 3b is such that they are moved a little away from the fuselage of the capsule 2. The distance between the center of each braked wheel 3b and the fuselage is a little greater than the distance between the center of each driven wheel 3a and the fuselage. The rods 26 of the vertical positioning actuators 9, which slide in the cylinders 27, are positioned at different heights, while keeping constant the height, the pitching, the roll, and the yaw of the capsule 2. It can be seen that each vertical positioning actuator 9 is provided with a spring system 28.

Figure 3:
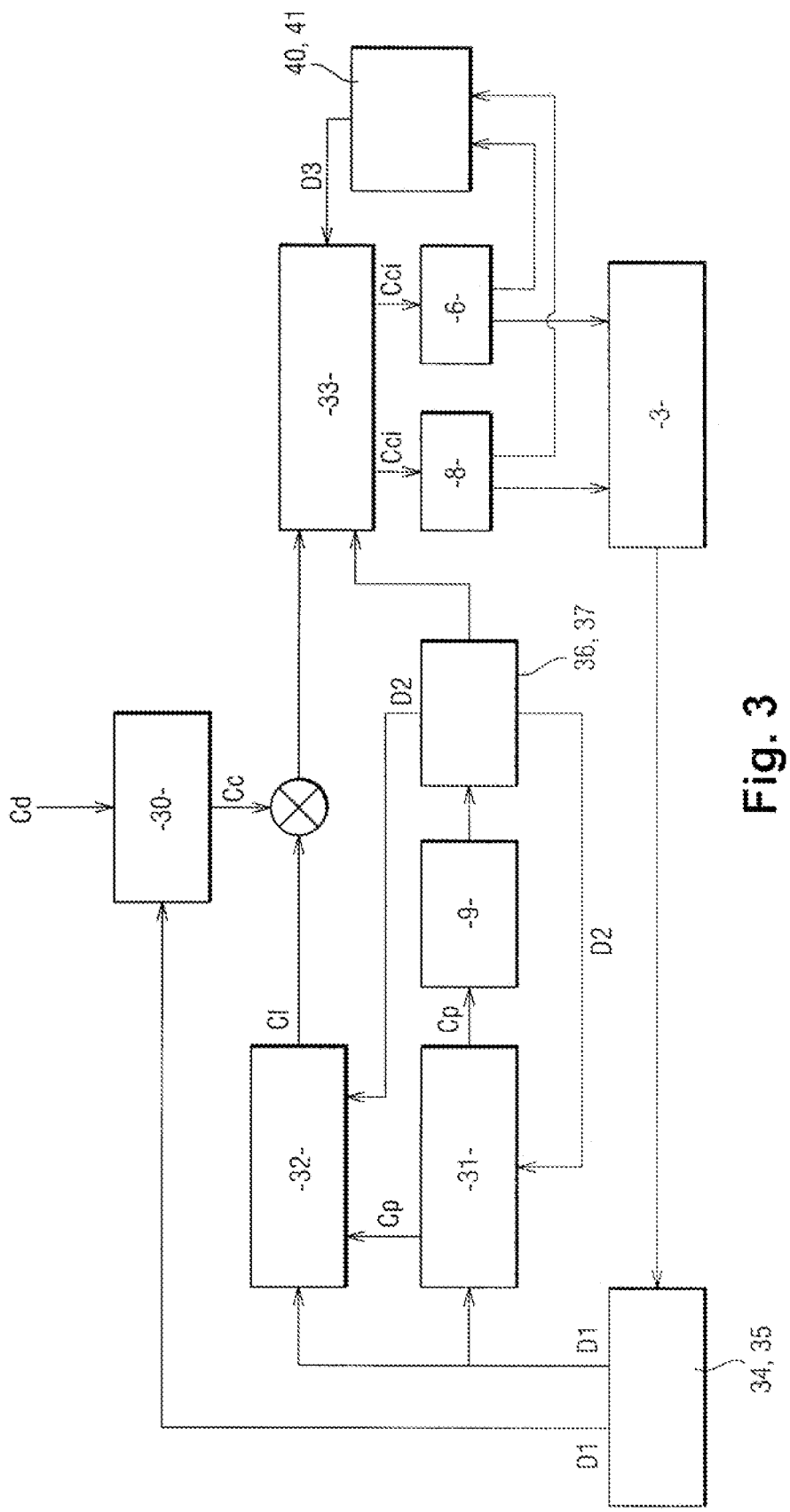
FIG. 3 is a block diagram of the functions implemented in control means for the ground movement system of the invention.

With reference to FIG. 3, there can be seen a block diagram of the control means comprising a central controller 30, a vertical positioning controller 31, a torque limiting controller 32, and a torque distributor 33.

The central controller 30 receives a movement setpoint Cd for the capsule 2 for the purpose of accelerating or braking the capsule 2. The movement setpoint Cd for the capsule 2 is produced by a pilot of the capsule 2, e.g. by acting on the pedal, by an autopilot system of the capsule 2, or indeed by a speed regulator of the capsule 2, by an automatic braking system of the capsule 2, etc.

The central controller 30 also acquires first data D1 representative in particular of the movement of the capsule 2.

This first data D1 comprises measurements of first parameters as produced directly by first sensors 34, or else estimates of the first parameters as produced by first estimation algorithms 35.

By way of example, the first parameters comprise parameters that are specific to the capsule 2 as a whole: speed and acceleration of the capsule 2, temperature of the capsule 2, inertial data, etc.

By way of example, the first parameters also comprise parameters specific to each wheel of the capsule 2: speed of rotation of the wheel, acceleration, slipping of the tire of the wheel, tire pressure, temperature of the friction members of the brake, etc.

By way of example, the first parameters further comprise parameters that are external to the capsule 2: ground conditions in the tube in which the capsule 2 is travelling, conditions of the surroundings, etc.

On the basis of the first data D1 and of the movement setpoint Cd, the central controller 30 thus generates torque commands Cc for the actuated wheels 3 (i.e., in this example, for the driven wheels 3a and for the braked wheels 3b).

The vertical positioning controller 31 also acquires the first data D1 (or at least some of the first data D1), and in particular data representative of the degree of slipping of the actuated wheels 3.

The vertical positioning controller 31 monitors the degree of slipping of the actuated wheels 3.

The vertical positioning controller 31 establishes or acquires a load distribution, as a function in particular of the degree of slipping of the actuated wheels 3 and as a function of whether the capsule 2 is in a braking stage or in an acceleration stage.

Thereafter, the vertical positioning controller 31 controls the vertical positioning actuator 9 of each actuated wheel 3 in such a manner as to adjust the vertical position of said actuated wheel 3 so that the load applied on said actuated wheel 3 corresponds to the load distribution.

In order to establish the load distribution, the vertical positioning controller 31 adds load to the driven wheels 3a during an acceleration stage, and to the braked wheels 3b during a braking stage (and possibly also to the driven wheels 3a, if they are used during the braking stage).

In contrast, the vertical positioning controller 31 subtracts load from any actuated wheels 3 that are slipping a little, or indeed from any non-actuated wheels, or indeed from any actuated wheels 3 that are not being actuated during the acceleration or braking stage.

The vertical positioning controller 31 then controls the vertical positioning actuators 9, in particular as a function of this load distribution. To do this, the vertical positioning controller 31 produces positioning commands Cp for the vertical positioning actuators 9, and it acquires second data D2.

The second data D2 comprises measurements of second parameters as produced directly by second sensors 36, or else estimates of the second parameters as produced by second estimation algorithms 37.

The second parameters relate to the vertical positioning actuators 9 and by way of example, for each vertical positioning actuator 9, they comprise the load supported by said vertical positioning actuator 9, the linear position of the rod, the electric current being drawn by the electric motor, the angular position of the rotor of the electric motor, etc.

The torque limiting controller 32 acquires the first data D1, the second data D2, and also the positioning commands Cp produced by the positioning controller 31.

The purpose of the torque limiting controller 32 is to limit the torque command Cc produced by the central controller 30 in the event of an actuated wheel 3 of the capsule 2 slipping considerably or skidding.

The torque limiting that is performed is better than that performed by a conventional anti-lock system. The torque limiting acts, in real time, to take account of the vertical positioning of the actuated wheels 3 and of the positioning commands Cp that are transmitted to the vertical positioning actuators 9.

Specifically, in the event of an actuated wheel 3 slipping, it is appropriate to reduce the drive torque or the braking torque on the actuated wheel 3, unless the vertical positioning controller 31 has taken this slip into account and has ordered a transfer of load onto said actuated wheel 3 for the purpose of adapting the vertical positioning in order to limit the effects of the slipping.

The torque limiting controller 32 thus generates a limiting command Cl seeking to limit the torque command Cc for the actuated wheels 3, and that depends on the positioning commands Cp produced by the vertical positioning controller 31.

The torque distributor 33 acquires the torque commands Cc produced by the central controller 30, the limiting commands Cl produced by the torque limiting controller 32, and the second data D2 coming from the second sensors 36 or from the second estimation algorithms 37.

The torque distributor 33 generates independent individual torque commands Cci for the drive devices 6 of the driven wheels 3a and for the brakes 8 of the braked wheels 3b.

The torque distributor 33 monitors these individual torque commands Cci by acquiring third data D3.

The third data D3 comprises measurements of third parameters as produced directly by third sensors 40, or else estimates of the third parameters as produced by third estimation algorithms 41.

The third parameters comprise the temperatures of the drive devices 6 and of the braking actuators or of the friction members of the brakes 8, the drive and braking torques, etc.

Torque distribution may serve to manage actuator temperatures, to manage different frequencies for activating the anti-lock actions of the drive devices 6 and of the braking actuators, to manage depending on whether the current stage is a braking stage or an acceleration stage, to manage wear (in particular of the friction members), to manage regenerative braking, to manage the electricity consumption of the electric motors, etc.

As mentioned above, the load distribution as produced by the control means is established in particular as a function of the degrees of slip of the actuated wheels 3 and as a function of whether the capsule 2 is in a braking stage or an acceleration stage.

It is possible to envisage that the load distribution is also established as a function of the measured or evaluated temperatures of some or all of the above-mentioned pieces of equipment. These pieces of equipment comprise the actuated wheels 3, the vertical positioning actuators 9, the drive devices 6, the brakes 8, the friction members of the brakes, the braking actuators, the electric motors, etc.

The load applied to certain actuated wheels 3 is limited when the actuators of said actuated wheels 3 have been activated a great deal (in frequency and duration), or when they have been activated very strongly. This serves to avoid the equipment being subjected to excessive heating, which might cause temperature to rise above an acceptable range.

It is also possible to envisage that the load distribution is also established as a function of the degree of wear of the tires of the driven wheels 3. For example, when a braked wheel 3b has been braking a great deal or has been subjected to hard braking, e.g. emergency braking, the load applied to said braked wheel is limited in order to limit the wear of its tire.

This serves to limit the wear of the tires of the actuated wheels 3.

It should be observed that in order to modify the load distribution, it is also be possible to envisage varying the stiffnesses of the vertical positioning actuators 9 instead of controlling the positions of their moving parts (rods). A vertical positioning actuator 9 would then operate like a spring having its stiffness modified.

By using an ideal spring equation:

$$F=k(x+\Delta x)$$

it can be understood that this method modifies the stiffness coefficient $\underline{k}$ and has an effect on the equilibrium position $\underline{x}$. The position of the movable rod needs to be modified in order to re-balance the spring.

In contrast, In the invention, it is not the stiffness of the spring that is changed, but rather an offset $\Delta x_{off}$ is added to increase the load on the spring.

Adding the offset may be expressed in the following form:

$$F=k(x+\Delta x+\Delta x_{off})$$

i.e.:

$$F=k(x+\Delta x)+k(\Delta x_{off}).$$

The $k(x+\Delta x)$ term represents the equilibrium force of the spring and the $k(\Delta x_{off})$ term represents the additional load applied to the spring as a result of changing the position of the rod (associated with $\Delta x_{off}$ but not exactly equal to $\Delta x_{off}$).

It is known that the Hyperloop® capsule 2 travels in an evacuated tube. In an evacuated tube, any fluid leakage is very problematic as a result of de-gassing phenomena. Sealing of the vertical positioning actuator 9 is thus a parameter that is critical. However, when the vertical positioning actuator is a hydraulic actuator, changing stiffness consists in causing hydraulic fluid to be transferred between chambers of the actuator.

It is thus very advantageous in an application to a Hyperloop® capsule to avoid changing the stiffness of the "spring" in order to avoid any potential risk of fluid leakage.

When the vertical positioning actuator 9 is a hydraulic actuator, it would also be possible to envisage modifying the internal shapes of the chambers. This solution is more complex to implement and less effective, since the wheel is positioned less accurately.

Naturally, the invention is not limited to the embodiment described and covers any variant coming within the ambit of the invention as defined by the claims.

Above, the invention is implemented in a Hyperloop® capsule. Nevertheless, the invention is not limited to this application, and it may be implemented in any type of capsule that is to travel in an evacuated tube, and more generally it may be implemented in any type of land transport vehicle regardless of whether or not it travels in a tube, and that is capable of levitating with levitation of any type: capsule, train with lift that is magnetic (electrodynamic or electromagnetic), etc.

The description above relates to an electromechanical actuator that is fitted with electric motors: rotary drive devices, braking actuators, vertical positioning actuators. It would naturally possible to use different actuators, e.g. hydraulic actuators or pneumatic actuators.

The architecture of the control means, both in terms of its block diagram and also in terms of its equipment (electrical power modules and electrical control modules), could naturally be different from the above description.

The capsule could have other numbers of wheels and bogies. For example, there could be six or eight wheels per bogie, three or four bogies per capsule, etc.

There could also be a different distribution between the braked wheels and the driven wheels. It is also possible to imagine that some of the wheels could be simultaneously both braked and driven (i.e. fitted with a brake and with a drive device), or else that only the braked wheels or only the driven wheels are provided with vertical positioning actuators, etc.

The invention claimed is:

1. A ground movement system for a land transport vehicle capable of levitating, the vehicle comprising a plurality of wheels including at least one actuated wheel, a drive device for driving the actuated wheel and/or a brake for braking the actuated wheel, a vertical positioning actuator arranged to move the actuated wheel vertically relative to a fuselage of the vehicle, and control means arranged to act, during an acceleration stage and/or during a braking stage of the vehicle, to control the vertical positioning actuator to adjust the vertical position of the actuated wheel based on a levitation of the land transport vehicle and in order to increase the load carried by the actuated wheel and thus increase the maximum force that can be transmitted to the ground by the actuated wheel so as to increase the maximum drive and/or braking torque that can be produced by the drive device and/or by the brake without the actuated wheel skidding or slipping.

2. A ground movement system according to claim 1, comprising a plurality of actuated wheels including at least one driven wheel and at least one braked wheel, the ground movement system further comprising a drive device for each driven wheel, a brake for each braked wheel, and a vertical positioning actuator for each driven wheel and for each braked wheel.

3. A ground movement system according to claim 2, wherein the control means are arranged to establish a load distribution for distributing the load of the vehicle among the actuated wheels and for controlling the vertical positioning actuator of each actuated wheel so as to adjust the vertical position of said actuated wheel so that the load applied to said actuated wheel corresponds to the load distribution.

4. A ground movement system according to claim 3, wherein the control means are arranged to establish the load distribution as a function of degrees of slip of the actuated wheels and as a function of the vehicle being in a braking stage or in an acceleration stage.

5. A ground movement system according to claim 4, wherein the control means are arranged to establish the load distribution as a function of measured or evaluated temperatures of the actuated wheels and/or of the vertical positioning actuators and/or of the drive devices and/or of the brakes so as to avoid any excessive heating occurring.

6. A ground movement system according to claim 4, wherein the control means are arranged to establish the load distribution as a function of degrees of wear of tires of the actuated wheels.

7. A ground movement system according to claim 2, comprising at least one independent bogie comprising two driven wheels and two braked wheels.

8. A ground movement system according to claim 7, wherein one of the two driven wheels is situated on a right side and the other of the two driven wheels is situated on a left side of the bogie, and wherein one of the two braked wheels is situated on a right side and the other of the two braked wheels is situated on a left side of the bogie.

9. A ground movement system according to claim 8, wherein the two driven wheels are outer wheels and the two braked wheels are inner wheels.

10. A ground movement system according to claim 1, wherein the vertical positioning actuator comprises a leg having a cylinder secured to the fuselage and a rod arranged to slide inside the cylinder, the actuated wheel being mounted at the bottom end of the rod.

11. A ground movement system according to claim 10, wherein the vertical positioning actuator is also arranged to extend the rod and place the actuated wheel on the ground during stages of accelerating and braking the vehicle on the ground, and to retract the rod while the vehicle is levitating.

12. A land transport vehicle capable of levitating, the vehicle including a ground movement system according to claim 1.

13. A vehicle according to claim 12, the vehicle being a pressurized capsule configured to travel through a network of tubes.

* * * * *